(12) United States Patent
Ness et al.

(10) Patent No.: US 8,048,300 B1
(45) Date of Patent: Nov. 1, 2011

(54) OIL SPILL RECOVERY VESSEL

(76) Inventors: George Ness, Zephyrhills, FL (US);
Janet Ness, Zephyrhills, FL (US)

( * ) Notice: Subject to any disclaimer, the term of this patent is extended or adjusted under 35 U.S.C. 154(b) by 0 days.

(21) Appl. No.: 13/041,415

(22) Filed: Mar. 6, 2011

(51) Int. Cl.
*E02B 15/04* (2006.01)
(52) U.S. Cl. .................. 210/242.1; 210/242.3; 210/923
(58) Field of Classification Search ............ 210/170.05, 210/170.09, 170.11, 242.1, 242.3, 776, 923
See application file for complete search history.

(56) References Cited

U.S. PATENT DOCUMENTS

| | | | | |
|---|---|---|---|---|
| 3,623,609 A | * | 11/1971 | Ainlay | 210/242.3 |
| 3,656,624 A | * | 4/1972 | Walton | 210/242.3 |
| 3,928,206 A | * | 12/1975 | Waren | 210/242.3 |
| 4,039,454 A | * | 8/1977 | Miller et al. | 210/242.3 |
| 4,456,536 A | * | 6/1984 | Lorenz et al. | 210/776 |
| 5,051,181 A | * | 9/1991 | Sandkvist | 210/242.3 |
| 5,173,182 A | * | 12/1992 | Debellian | 210/242.3 |
| 5,173,185 A | * | 12/1992 | Stokes | 210/242.3 |
| 5,207,901 A | * | 5/1993 | Ravagnan | 210/242.3 |

\* cited by examiner

*Primary Examiner* — Christopher Upton
(74) *Attorney, Agent, or Firm* — Stephen Powers

(57) ABSTRACT

An oil recovery vessel utilizing a hybrid hull wherein the bow portion is a catamaran style hull having an oil collection assembly intermediate the port and starboard hull portions of the bow. The oil recovery vessel further includes an oil collection assembly proximate the bow of the vessel. The oil collection assembly is formed with three walls and a floor and is operable to be moved in an upwards-downwards direction so that the floor may be positioned beneath the waterline of the vessel. The oil collection assembly further includes two rotating drums having perpendicular members protruding therefrom that are above ramp members. The ramp members are connected to transfer assembly containers having therein a transfer blade that is helical in shape. The transfer blade moves the oil into a collection chamber that the transfer blade is hermetically sealed therewith. Pipes connect the transfer assembly containers to separation tanks that separate the oil and water mixture received. A plurality of storage containers are coupled to the separation tanks so as to receive the oil.

11 Claims, 6 Drawing Sheets

OIL SPILL RECOVERY VESSEL

FIELD OF THE INVENTION

The present invention relates to an oil spill recovery vessel, more specifically but not by way of limitation, an oil spill recovery vessel having a hybrid hull with a port and starboard catamaran style hull in the forward section of the hull. A collection assembly is intermediate the forward port and starboard portions of the hull and is configured to be vertically adjustable so as to facilitate the collection of materials floating on the surface of the water.

BACKGROUND

Over the last several decades there have been numerous catastrophic events resulting in major oil spills in various parts of the world. Numerous technologies have been employed during the remediation processes that have failed to substantially capture the oil and prevent significant ecological damage. Increased demand has further generated a significant rise deep sea drilling and discovery, which can also lead to minor but often frequent contamination. The increase in the presence of wells offshore will ultimately increase the tonnage of petroleum products transported or handled at sea. This will result in the increased likelihood of future oil spills in relation to these activities. The increased likelihood of oil spills in relation to the aforementioned activities, therefore, creates a need for oil spill recovery equipment that is capable of extracting the oil from the sea environment with greater efficiency and capacity.

For example, current technology commonly used incorporates a barge or other similar style vessel that has deployed therefrom at least one oleophilic belts which function to lift an oil slick from the surface of the sea water to a wringing device that compresses the oil from the belt and transfers into a storage tank on the barge. While this has shown to be successful in calm water, it is not effective in average seas that are often present on the world's oceans. Additionally, the vessels associated with this type of oil recovery system are typically not seaworthy to withstand above average seas. A further limitation is the rate at which this recovery process occurs, which is often very slow resulting in a percentage of the oil sinking beyond a depth at which it can be recovered.

Another example of existing technology for oil spill recovery is the utilization of booms in combination with suction technology. The booms are deployed to circumferentially surround at least a portion of the oil spill and a recovery vessel having suction technology utilizes an intake to draw up the oil floating on the surface of the water. This type of equipment is particularly inefficient in that it intakes a significant volume of sea water and has shown to have problems in choppy water. Furthermore, the intakes of the suction technology are often prone to clog and breakdown with debris entering the suction system.

Accordingly, there is a need for an oil recovery vessel that can facilitate a rapid collection of oil from the surface of the water regardless of the sea conditions and wherein the oil collection does not collect a significant percentage of water in the recovery yield. Additionally, an improved ability to manage potential debris and substantially avoid any issues caused by the presence of the debris and the oil recovery collection is needed.

SUMMARY OF THE INVENTION

The object of the present invention is to provide an oil recovery vessel that includes a displacement hull having a separate forward port and starboard portion wherein an oil collection assembly is intermediate thereto.

Another object of the present invention is to provide an oil recovery vessel having an oil collection assembly proximate the bow that is vertically adjustable with respect to the level of the water.

Yet a further object of the present invention is to provide an oil recovery vessel having an oil collection assembly proximate the bow that includes at least one rotating cylinder having perpendicularly mounted members that will engage the top surface of the water.

Still another object of the present invention is to provide an oil recovery vessel having an oil collection assembly on the bow of the vessel that further includes a first collection container that is operably connected to the rotating cylinders and immediately aft thereof.

An additional object of the present invention is to provide an oil recovery vessel that includes an oil collection assembly on the bow of the vessel that includes a second collection container being disposed within the first collection container.

Yet another object of the present invention is to provide an oil recovery vessel that includes an oil collection assembly proximate the bow of the vessel, wherein a transfer member is disposed within the first collection container and sealably connected to the second collection container.

Still another object of the present invention is to provide an oil recovery vessel that includes an oil collection assembly proximate the bow of the vessel that includes at least one separation tank operably coupled to the second collection container.

Yet a further object of the present invention is to provide an oil recovery vessel having an oil collection assembly on the bow of the vessel that includes a plurality of storage tanks operably coupled with the separation tank.

An additional object of the present invention is to provide an oil recovery vessel that can vertically adjust the oil collection assembly in order to position the oil collection assembly with respect to the waterline so as to reduce the amount of water collected.

A further object of the present invention is to provide an oil recovery vessel having an oil collection assembly that additionally includes a filter so as to substantially eliminate any interference in the oil collection process from surface debris.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
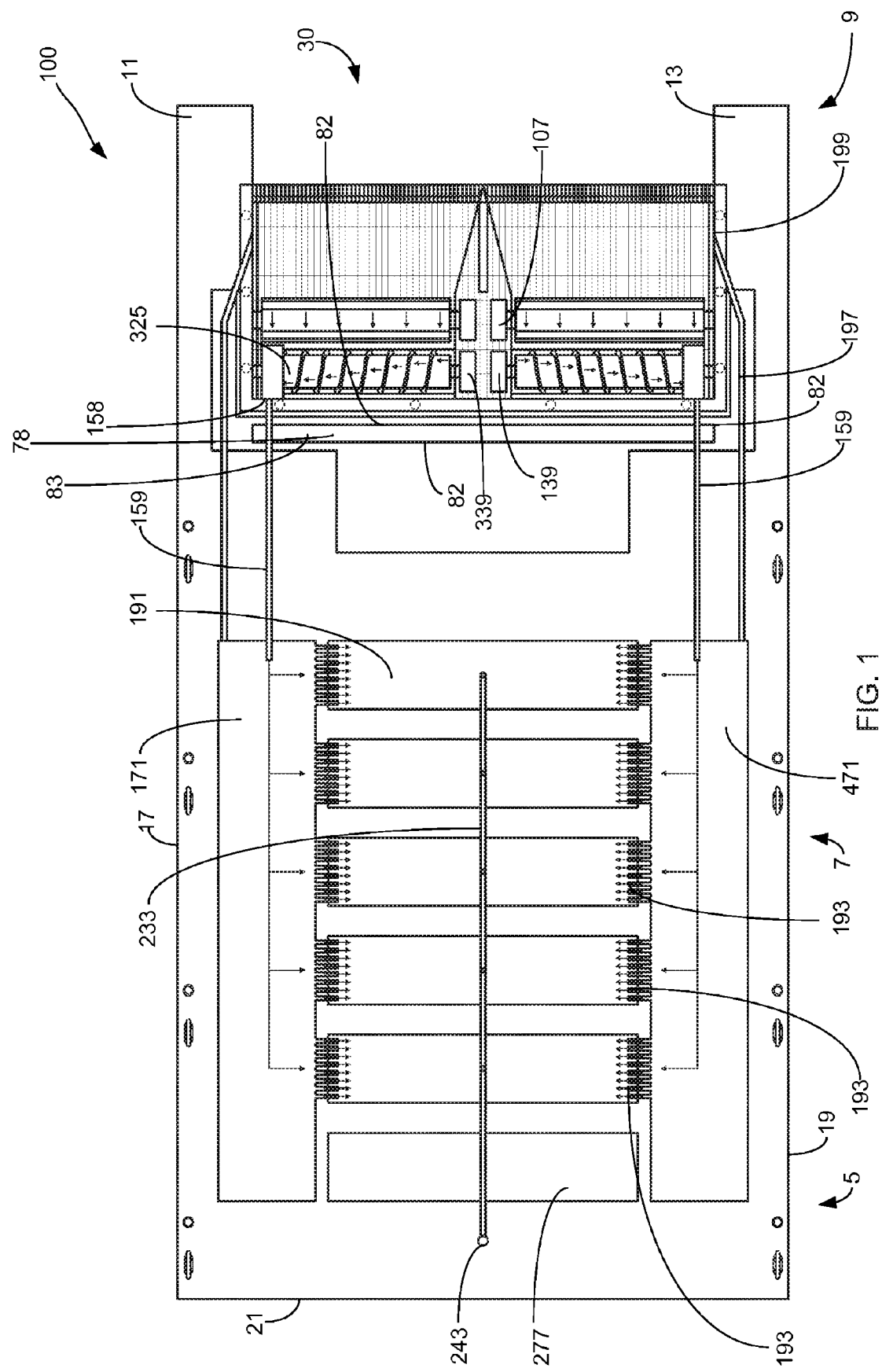
FIG. 1 is a top view of the preferred embodiment of the present invention.
Figure 2:
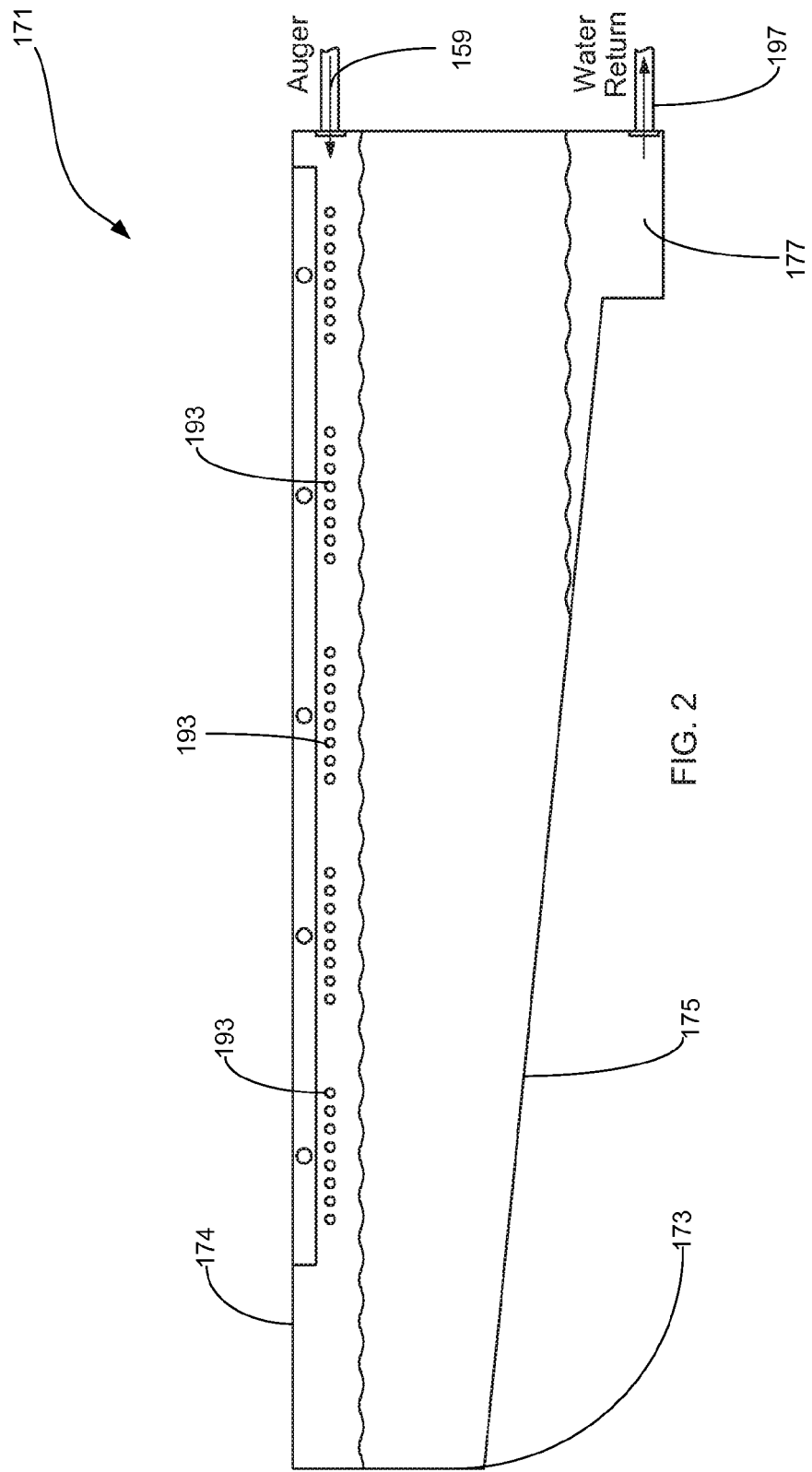
FIG. 2 is a side cross-sectional view of a separation tank of the present invention.
Figure 3:
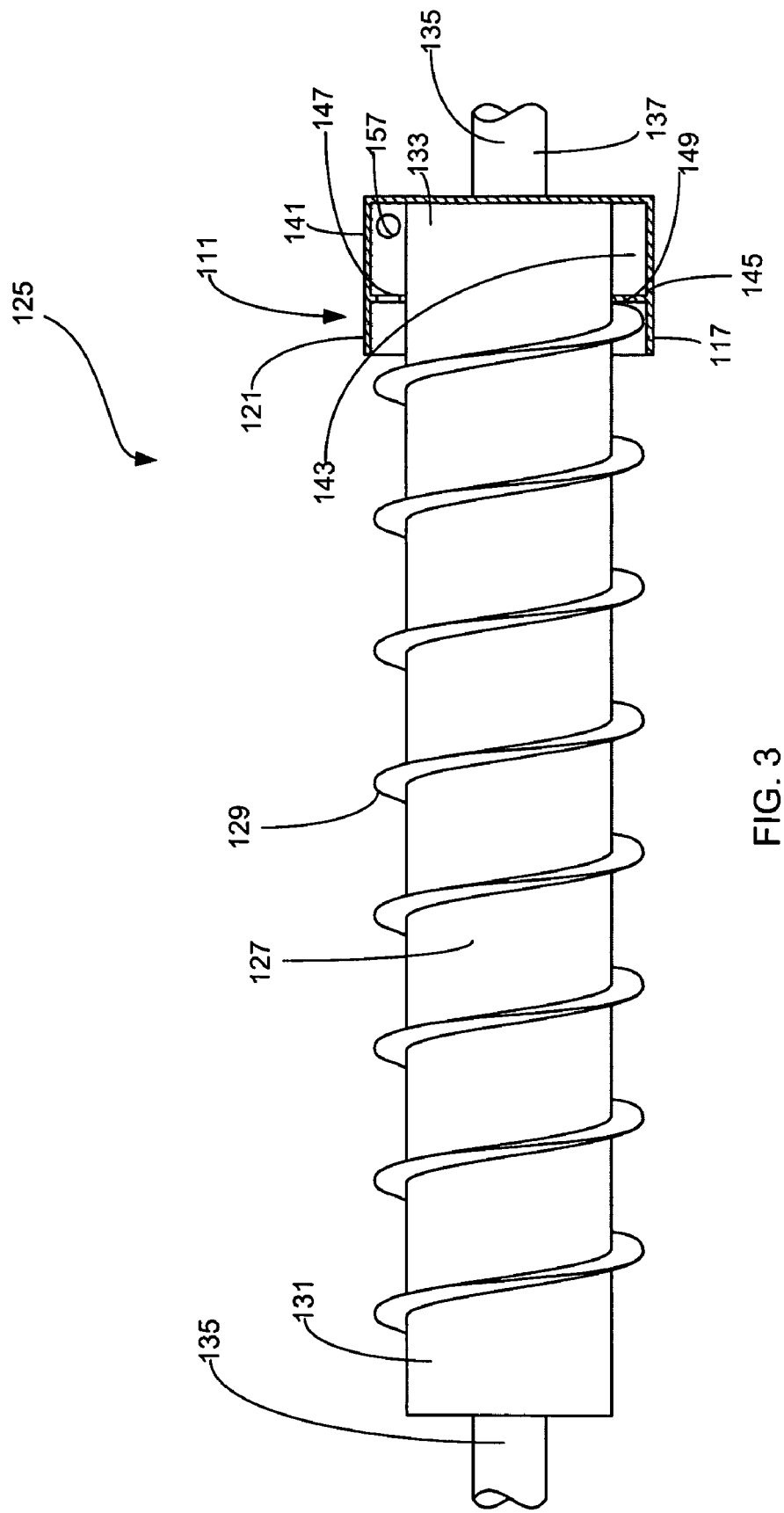
FIG. 3 is a side view of the transfer member of the present invention engaged with the second collection container.
Figure 4:
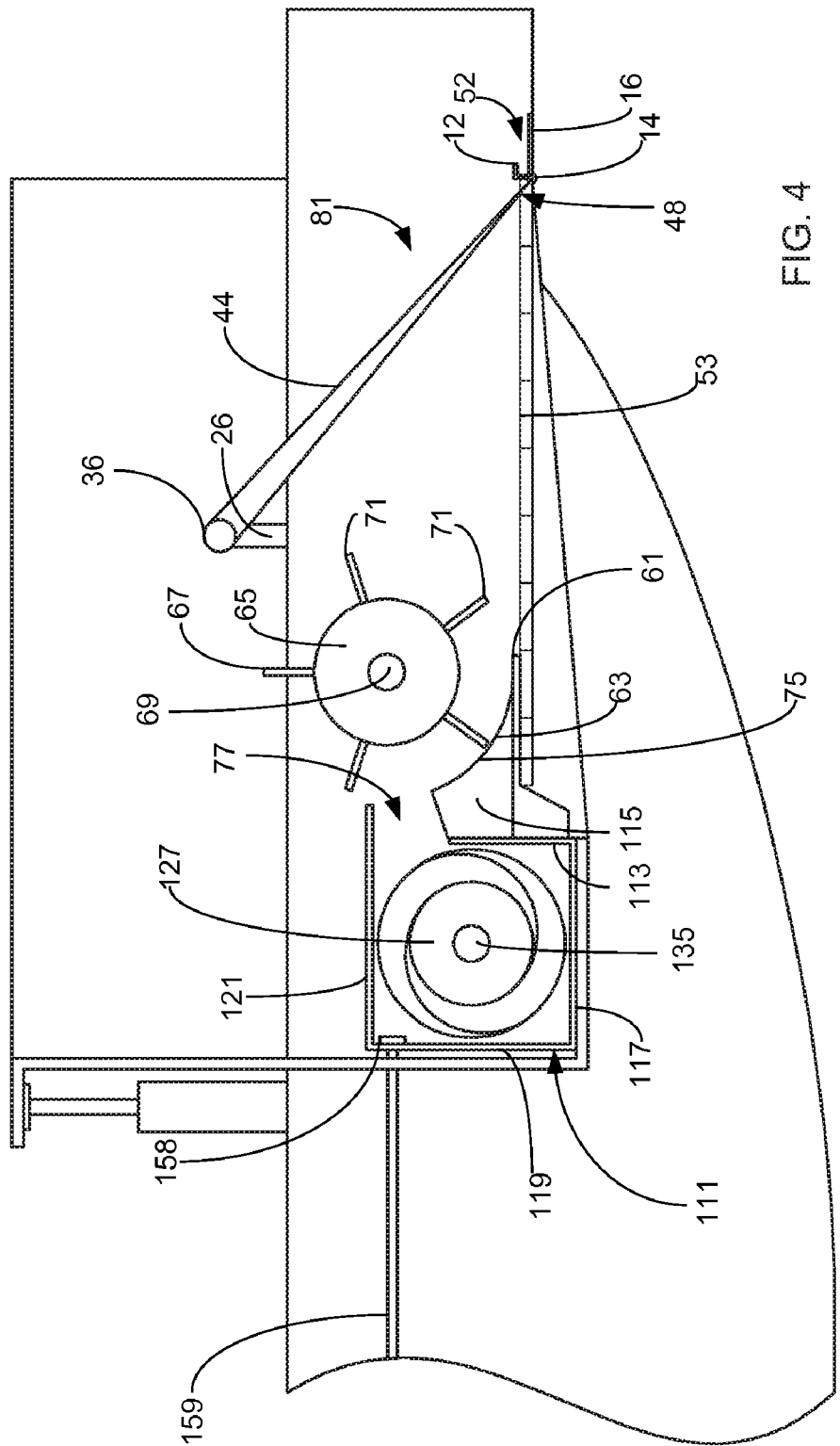
FIG. 4 is a side cross-sectional view of the oil collection assembly of the present invention.

Referring now to the drawings submitted herewith, wherein various elements depicted therein are not necessarily drawn to scale and wherein through the views and figures like elements are referenced with identical reference numerals, there is illustrated a oil recovery vessel 100 constructed according to the principles of the present invention.

Figure 6:
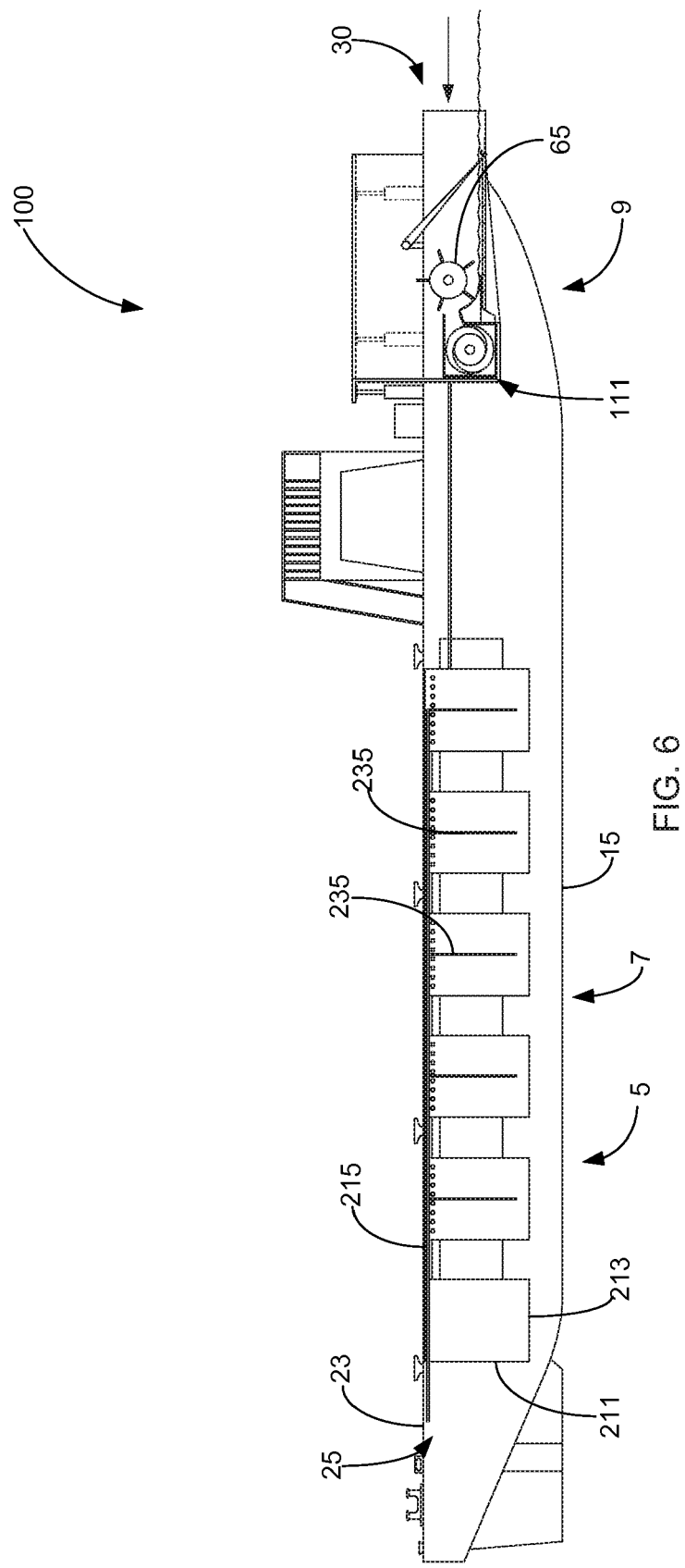
FIG. 6 is a side cross-section view of the present invention.

As shown in particular to FIG. 1 and FIG. 6, the oil recovery vessel 100 includes a hybrid hull 5 combining a mono-hull portion 7 with a catamaran style bow portion 9 having transversely spaced longitudinal hull portions 11, 13. The catamaran style bow portion 9 is integrally secured to the mono-hull portion 7 utilizing conventional shipbuilding techniques. The hybrid hull 5 is generally rectangular in shape and is constructed from suitable durable materials such as but not limited to metal. The hybrid hull 5 includes a generally flat bottom 15 integrally formed with a port side wall 17, starboard side wall 19 and stern wall 21. The flat bottom 15, port side wall 17, starboard side wall 19 and stern wall 21 are integrally formed utilizing suitable durable techniques. While not illustrated in the drawings submitted herewith, the hybrid hull 5 is constructed utilizing conventional ship building techniques wherein the hybrid hull 5 further includes conventional bulkheads, stringers, beams and other commonly used support structures to provide structural support for the hybrid hull 5. A work deck 23 extends intermediate the port side wall 17 and starboard side wall 19 proximate the top portion 25 of the hybrid hull 5. While the oil recovery vessel 100 is shown as a barge style vessel, it is contemplated within the scope of the present invention that oil recovery vessel 100 could have its own source of marine propulsion. Additionally, while not illustrated herein it is contemplated within the scope of the present invention that the hybrid hull 5 could further include diversion members extending outward in a lateral and forward direction from the catamaran style bow portion 9. The diversion members are substantially rigid plates that are vertically adjustable so as to be configured to be placed such that at least a portion of the diversion members are beneath the water line. The diversion members would function to increase the width of oil collection recovery as the oil recovery vessel 100 is pushed through the water. While the oil recovery vessel 100 is illustrated herein as having a hybrid hull 5 design, it is contemplated within the scope of the present invention that the oil recovery vessel 100 could be manufactured utilizing a conventional mono-hull or catamaran style hull design.

Movably secured to the bow portion 9 of the oil recovery vessel 100 is the oil collection assembly 30. The oil collection assembly 30 functions to be vertically adjustable so as to be placed in position such that the oil collection assembly 30 can retrieve oil or other waste that is floating on the surface of the water that flows intermediate the longitudinal hull portion 11,13 of the bow portion 9. The oil collection assembly 30 further includes a port wall member 33, a starboard wall member 35 and an aft wall member 37. The port wall member 33, starboard wall member 35 and aft wall member 37 are secured proximate the corners 39, 41 utilizing suitable durable techniques. The port wall member 33, starboard wall member 35 and aft wall member 37 are generally vertical in orientation and are manufactured from a suitable durable material such as but not limited to metal. Secured to the top edge 43 are lateral support members 45. The lateral support members 45 are generally perpendicular to the wall members 40 and function to provide an interface for the hydraulic cylinders 49 to engage the wall members 40 and move the oil collection assembly 30 in an upwards or downwards direction. A plurality of hydraulic cylinders 49 are disposed around the outer perimeter of the oil collection assembly 30. The hydraulic cylinders 49 are secured to the bow portion 9 utilizing suitable methods. The hydraulic cylinders 49 are conventional hydraulic cylinders and are powered using conventional techniques such as but not limited to electric power. While a plurality of hydraulic cylinders 49 illustrated herein being configured to move the oil collection assembly 30 in an upwards-downward direction, it is contemplated within the scope of the present invention that the oil collection assembly 30 could be movably attached to the bow portion 9 utilizing numerous suitable methods so as to achieve the desired functionality of an upwards-downwards movement of the oil collection assembly 30.

Proximate the bottom portion 51 of the wall members 40 is a floor 53. The floor 53 is generally horizontal in manner and is manufactured from a material such as but not limited to expanded metal. The floor 53 includes a plurality of apertures 55 in order to allow water to pass therethrough subsequent the floor 53 being placed in a position such that it is at least partially beneath the water line of the vessel. The floor 53 is secured to the wall members 40 utilizing suitable durable methods and functions to provide a working deck surface intermediate the bow portion 9. Positioned generally underneath the floor 53 and substantially in-line with the centerline of the oil recovery vessel 100 is floating support member 57. The floating support member 57 is secured to the floor 53 utilizing suitable durable methods and functions to provide additional support for the oil collection assembly 30. The floating support member 57 moves with the oil collection assembly 30 in an upwards-downwards direction. It is contemplated within the scope of the present invention that the oil collection assembly 30 could have formed having no floating support members 57 or a plurality thereof.

Located at the forward edge 48 of the floor 53 are a plurality of filter tines 52. The filter tines 48 are operably connected to a pair of arms 44,46. The arms 44 and 46 are pivotally connected at hinges 36, 38 to support posts 26, 28. The filter tines 48 function to filter larger debris such as but not limited to sticks or seaweed so as to prevent the debris from further entering the oil collection assembly 30. The filter tines 48 are formed utilizing members 16,14, and 12 to form a modified c-shape. The members 16,14, and 12 are manufactured from suitable durable material such as steel rod. The filter tines 48 are shaped in the modified c-shape so as to prevent the loss of debris as the filter tine assembly 81 is pivotally moved upward and aft such that the filter tines 48 are placed above the debris collection box 83. During operation of the oil recovery vessel 100, the filter tine assembly 81 will be pivotally moved upwards and aft as required such that the filter tines 48 will be generally above the debris collection box 83. In this position, any debris collected in the filter tines 48 can be removed and collected in the debris collection box 83. As the filter tine assembly 81 is transitioned to its second position, the modified c-shape of the filter tines 48 maintains the position of any debris captured therein. It is contemplated within the scope of the present invention that the filter tine assembly 81 could be moved utilizing manual or motorized methods. It is contemplated within the scope of the present invention that the filter tines 48 could be formed in numerous different shapes and still achieve the desired functionality as described herein. The debris collection box 83 is a conventional container having four walls 82 and a bottom 78 formed to create an interior volume operable to receive and store debris therein. The debris collection box 83 is generally rectangular in shape and is constructed of suitable durable materials. Those skilled in the art will recognize that the debris collection box 83 could be manufactured in numerous different shapes and be positioned in various positions on the oil recovery vessel 100 in order to receive debris from the filter tines 48.

As shown in particular in FIG. 6, the floor 53 of the oil collection assembly 30 is positioned just beneath the waterline utilizing the hydraulic cylinders 49. This position allows the contaminants that are floating on the surface of the water to be extracted from the water with less water intake by the oil collection assembly 30. As the oil or other floating contaminant enters the oil collection assembly 30 the floor 53 is positioned just beneath the waterline such that the forward edge 61 of the ramp member 63 skims the material from the top of the water. A rotating drum 65 having a plurality of blades 67 extending therefrom is positioned generally above the ramp member 63. The blades 67 extend longitudinally along the rotating drum 65. The blades 67 are planar in manner and are manufactured from a suitable durable material. The rotating drum 65 is generally cylindrical in shape and is manufactured from a suitable durable material such as but not limited to metal. The rotating drum 65 is operably coupled to a conventional motor 107 utilizing shaft 69. As the oil recovery vessel 100 is operated, the rotating drum 65 is spun at a desired rate by the motor 107. The blades 67 are positioned such that the tip 71 of the blades 67 contact with the arcuate surface portion 75 of the ramp member 63. As the tip 71 traverses along the arcuate shaped portion 75 of the ramp member 63, any materials superposed on the ramp member 63 are propelled towards opening 77. The ramp member 63 is formed having the arcuate shaped portion 75 wherein the arcuate angle of the arcuate shaped portion 75 is substantially similar to the angular path of the tip 71 of the blades 67 as the rotating drum 65 revolves in a clockwise direction. The mateable angles of the arcuate shaped portion 75 and the rotational angle degree of the tip 71 function to efficiently traverse any material on the ramp member 63 towards opening 77. While not illustrated herein, it is contemplated within the scope of the present invention that the tip 71 of the blades 67 could have integrally formed thereon a slightly pliable material such as but not limited to silicon to as to ensure a substantially leak-proof engagement between the tip 71 and the ramp member 63. While five blades 67 are illustrated in the drawings submitted herewith, it is contemplated that any number of blades 67 could be utilized in order to achieve the desired functionality as described herein.

Immediately aft of the ramp member 63 is the transfer assembly container 111. The transfer assembly container 111 includes a front wall 113 that is secured to the upper portion 115 of the ramp member 63. The front wall 113 is integrally formed with the bottom 117, rear wall 119 and top 121 to form an interior volume operable to receive materials from the ramp member 63. The transfer assembly container 111 is generally rectangular in shape and is manufactured from suitable durable materials. The transfer assembly container 111 has a length that is substantially equal to that of the ramp member 63 and rotating drum 65. The transfer assembly container 111 has disposed therein a transfer member 125. The transfer member 125 includes a shaft 127 that is generally cylindrical in shape and has secured thereto a blade 129. The blade 129 is a helical shape that is secured to the shaft 127 by welding or other suitable methods. The blade 129 extends generally from the first end 131 of the shaft 127 to the second end of the shaft 133. The transfer member 125 further includes a rod 135 that is centrally bored through the shaft 127 and operably coupled at end 137 to a motor 139. The motor 139 is a conventional combustion engine driven motor that functions to rotate the transfer member 125. As the transfer member is rotated, the helical shaped blade 129 functions to move any material deposited thereon towards end 133. Disposed within the transfer assembly container 111 proximate end 141 is a collection chamber 143. The collection chamber 143 is formed utilizing wall 145 that extends from the bottom 117. The transfer member 125 is hermetically sealed to the wall 145 at points 147, 149. The hermetic seal between the collection chamber 143 and transfer member 125 functions to allow material to pass into the collection chamber 143 that has been deposited on the transfer member 125 but substantially inhibit any material from egressing from points 147, 149. Those skilled in the art will recognize that numerous configurations could be utilized to create a sealable connection between the transfer member 125 and the collection chamber 143. The sealable connection between the transfer member 125 and the collection chamber 143 functions to assist in the pressurization of the collection chamber 143 as materials are transferred into the collection chamber 143. As the collection chamber 143 fills with a volume of materials that begins to exceed the volume of the collection chamber 143 a pressure is created therein. Subsequent the volume of materials exceeding the volume of the collection chamber 143 the materials will egress opening 157. The opening 157 is the first end 158 of the transfer pipe 159. The transfer pipe 159 operably couples the collection chamber 143 with the separation tank 171. The materials deposited into the collection chamber 143 are moved through the transfer pipe 159 utilizing a combination of the pressure created within the collection chamber 143 and subsequently a naturally occurring siphoning effect once the materials have begun to be deposited into the separation tank 171. It is further contemplated within the scope of the present invention that a conventional pump could be operably coupled to the transfer pipe 159 in order to assist in the transfer of materials from the collection chamber 143 into the separation tank 171. Those skilled in the art will recognize that the transfer pipe 159 could be manufactured in numerous different diameters.

Figure 5:
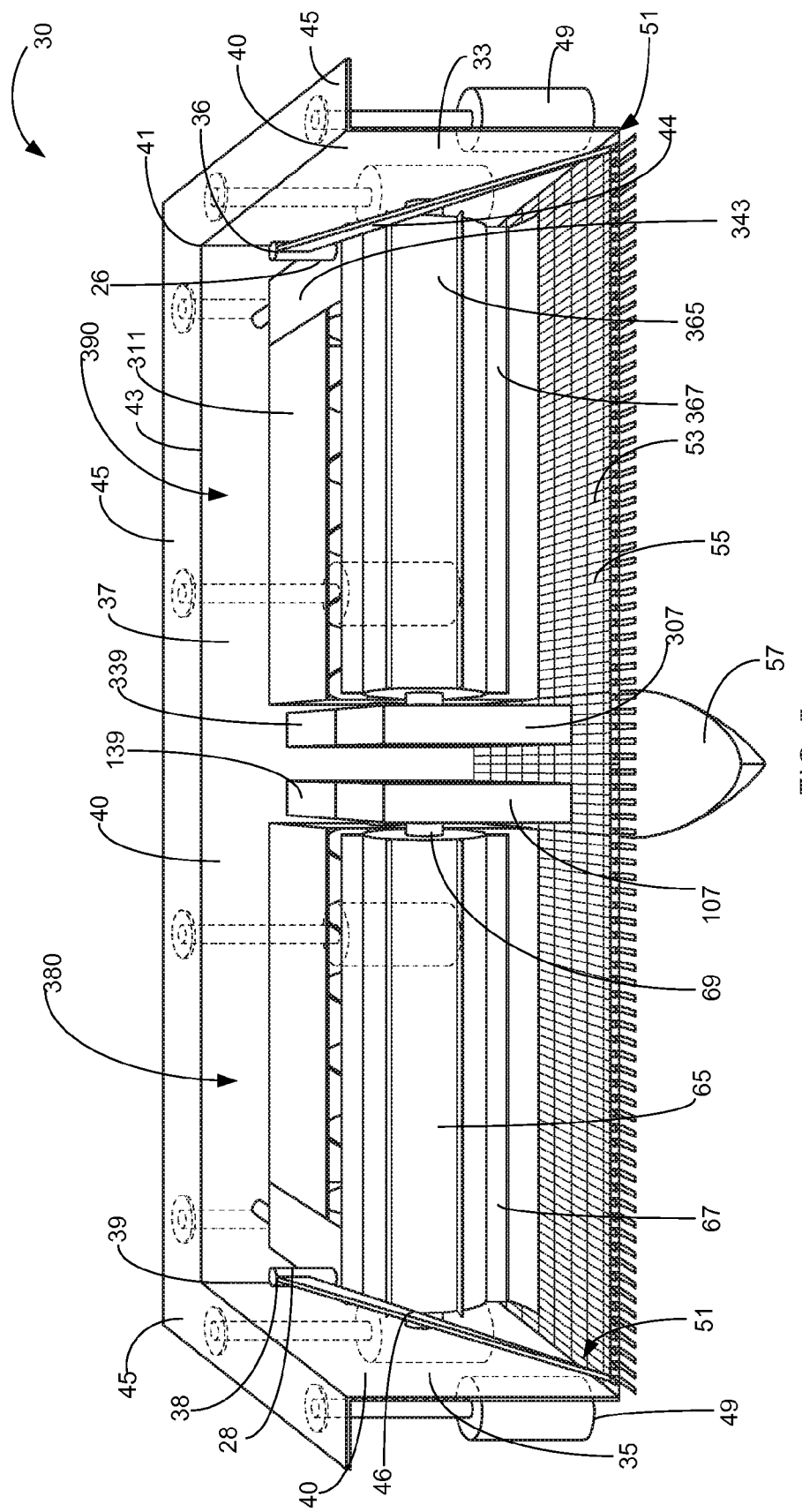
FIG. 5 is a front perspective view of the oil collection assembly of the present invention.

As is illustrated in FIGS. 1 and 5, the oil collection assembly 30 includes additional second identical elements as those referenced above. More specifically, a second rotating drum 365 having blades 367 is identically constructed as rotating drum 65 as discussed herein. A second motor 307 functions to rotate the second rotating drum 365 in the same manner as motor 107. A second ramp member 399 is formed in an identical manner as ramp member 63 being formed with a second transfer assembly container 311 constructed in an identical manner as the transfer assembly container 111. The second transfer assembly container 311 contains a second transfer member 325 constructed identically to the transfer member 125 having all the elements discussed herein. An additional motor 339 is operably coupled to the second transfer member 325 and operates exactly in the same manner as motor 139 described herein. While the motors 139, 339 are shown in separate housings having a space therebewteen, it is contemplated within the scope of the present invention that the motors 139, 339 could be placed adjacent to one another or be disposed within a common housing. Furthermore, a second collection chamber 343 is included within the second transfer assembly 311 and is constructed in the manner as discussed herein for the collection chamber 143. While a first oil collection apparatus 380 and a second oil collection apparatus 390 are illustrated and discussed herein, it is contemplated within the scope of the present invention that the oil collection assembly 30 could have only one oil collection apparatus 380 that extends between the longitudinal hull portions 9, 11.

The separation tank 171 is disposed within the hybrid hull 5 and is securely attached utilizing suitable durable methods. The separation tank 171 is formed with a plurality of walls 173, a top 174 and a bottom 175 creating an interior volume operable to receive the materials from the transfer pipe 159. The materials for the purposes herein are substantially an oil and water mixture. The separation tank 171 functions to initially capture the materials from the transfer pipe 159 and separate the mixture into an oil component and a water component. As the density and polarities of oil and water are different, the oil and water mixture will separate once deposited into the separation tank 171. The bottom 175 of the separation tank 171 is formed in an angular manner from the aft of the oil recovery vessel 100 sloping generally downward towards the bow portion 9 of the vessel. The angular nature of the bottom 175 will direct the water collected in the separation tank 171 towards the lower portion 177. As the separation tank 171 is filled with an oil and water mixture, the two materials will separate and the water will move towards the lower portion 177 due to its density and the oil will float on top any water present. While not illustrated herein, it is contemplated within the scope of the present invention that at least one of the walls 173 could have integrally formed therewith a sight window or other type of conventional volume gauge in order to monitor the level of fluid therein. As the oil becomes proximate the top 174 it will be transferred into the storage tanks 191 via a plurality of pipes 193. As the materials are deposited into the separation tank 171 the water will flow outward from the separation tank 171 via tube 197. Tube 197 is a conventional tube or pipe that has an interior passage capable of allowing a fluid to flow therethrough. The tube 197 directs the water from the separation tank 171 towards end 199. End 199 includes an opening (not illustrated herein) that deposits the water proximate the oil collection assembly 30. The water is deposited in this location so as to provide additional skimming of any oil that may have been mixed therewith. While not illustrated herein, it is contemplated within the scope of the present invention that a conventional control valve could be placed on the tube 197 to prevent the flow of any liquid therethrough until the separation tank 171 has been filled to a level such that the separation of the mixture deposited therein has occurred.

As illustrated in particular in FIG. 1, the oil recovery vessel 100 includes a second separation tank 471. The second separation tank 471 is constructed identically to the separation tank 171 and includes all of the elements thereof and operably connected thereto as described herein for the separation tank 171.

As shown in FIGS. 1 and 6 the oil recovery vessel includes a plurality of storage tanks 191. The storage tanks 191 are conventional tanks having a plurality of walls 211, bottom 213 and top 215 forming an interior volume operable to store a liquid therein. The storage tanks 191 are manufactured from suitable durable material such as but not limited to metal. The storage tanks 191 are secured amidships the oil recovery vessel 100 utilizing suitable methods. While a plurality of storage tanks 191 are illustrated herein, it is contemplated within the scope of the present invention that the oil recovery vessel 100 could have as few as one storage tank 191. Operably coupled to the storage tanks 191 is a hose 233. The hose 233 is a conventional hose having an interior passage allowing for fluid passage therethrough. The hose 233 further includes a plurality of ends 235 that are disposed within the storage tanks 191. The hose 233 includes end 243 that is secured to the deck 23 and functions to be operably coupled with a vacuum pump or other suctioning device that will facilitate the transfer of the oil disposed within the storage tanks 191 to another vessel or facility subsequent the storage tanks 191 having been filled to capacity. Those skilled in the art will recognize that the storage tanks 191 could be emptied utilizing numerous different methods and technologies in addition to or in conjunction with the desired method referenced herein. While the separation tank 171 and the storage tank 191 in the preferred embodiment of the oil recovery vessel 100 are generally beneath the deck 23, it is contemplated within the scope of the present invention that the separation tank 171 and storage tanks 191 could be superposed the deck 23.

Located aft of the storage tanks 191 is a fuel tank 277. The fuel tank 277 is a conventional tank having an interior volume and being constructed in a manner so as to safely store fuel such as diesel therein. The fuel tank 277 functions to provide fuel for the motors 107, 139, 307, 339. Additionally, the fuel tank 277 could be configured to supply fuel to a marine propulsion device located on the oil recovery vessel 100.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A vessel operable to recover contaminants floating on the surface of the water comprising:

a hull, said hull having a first portion and a second portion, said second portion further including a first longitudinal member and a second longitudinal member, said first longitudinal member and said second longitudinal member being on opposing sides of the beam of the vessel, said first longitudinal member and said second longitudinal member having a space therebetween, said second portion being the bow of the vessel;

a contaminant collection assembly, said contaminant collection assembly being intermediate said first and second longitudinal members, said contaminant collection assembly being movably secured to said hull, said contaminant collection assembly operable to move in an upwards-downwards direction, said contaminant collection assembly further including at least one drum, said at least one drum being rotatably mounted, said at least one drum having at least one blade secured thereto, said at least one blade being generally perpendicular to the surface of said at least one drum;

a transfer assembly, said transfer assembly being aft of said at least one drum, said transfer assembly configured to receive contaminants from said at least one drum, said transfer assembly having a plurality of walls and a bottom forming an interior volume;

a collection chamber, said collection chamber being operably coupled to said transfer assembly, said collection chamber configured to receive contaminants from said transfer assembly, said collection chamber having at least one wall forming an interior volume;

at least one separation tank, said at least one separation tank operably coupled to said collection chamber, said at least one separation tank operable to store contaminants received from said collection chamber;

a transfer blade, said transfer blade being disposed within said transfer assembly, said transfer blade being generally helical in shape, said transfer blade operable to move contaminants in a direction towards said collection chamber; and wherein said contaminant collection assembly further includes a floor, said floor operable to be placed generally beneath the water line of the vessel, said floor being manufactured from expanded metal, said floor having a plurality of apertures, said floor having a forward edge proximate the bow of the vessel.

2. The vessel as recited in claim 1, and further including a collection member, said collection member being underneath said at least one rotating drum, said collection member having a lower edge and an upper edge, said lower edge being proximate said floor, said upper edge being secured to said transfer assembly, said collection member having a surface area operable to engage said at least one blade of said at least one drum.

3. The vessel as recited in claim 2, and further including a filter assembly, said filter assembly being adjacent to said forward edge of said floor, said filter assembly having a plurality of tines, said filter assembly movably connected to said contaminant collection assembly.

4. The vessel as recited in claim 3, wherein said at least one separation tank includes a plurality of walls, a top and a bottom integrally formed to create an interior volume, said bottom being configured in an angular manner wherein said bottom angle in a downward direction from the aft of the vessel to the bow of the vessel.

5. The vessel as recited in claim 4, and further including at least one storage tank, said at least one storage tank being proximate said at least one separation tank, said at least one storage tank being operably coupled to said at least one separation tank.

6. An oil recovery vessel having a hybrid hull design wherein the oil recovery vessel is operable to have at least a portion thereof be positioned such that the portion is below the waterline of the vessel so as to recover oil from the surface of the water comprising:

a hull, said hull having a plurality of sides, a bottom and a deck, said hull having a first portion and a second portion, said second portion of said hull being the bow portion of the vessel, said second portion of said hull being a catamaran style hull, said first portion of said hull being aft of said second portion, said first portion of said hull being mono-hull in form and having a generally flat bottom;

an oil collection assembly, said oil collection assembly being secured to said second portion of said hull, said oil collection assembly having a port wall, a starboard wall and an aft wall, said port wall, starboard wall and aft wall being vertical in orientation, said port wall, starboard wall and said aft wall being integrally secured, said oil collection assembly having a top portion and a bottom portion, said oil collection assembly further including a lateral support member, said lateral support member proximate said top portion, said lateral support member being secured to said port wall, starboard wall and aft wall substantially around the perimeter of said oil collection assembly, said lateral support member being perpendicular to said port wall, starboard wall and aft wall, said oil collection assembly further including a floor, said floor having a plurality of apertures, said floor being proximate said bottom portion, said floor having a forward edge and an aft edge, said floor being intermediate said port wall and said starboard wall proximate said bottom portion of said oil collection assembly, said floor extending aftward and being further secured to said aft wall, said oil collection assembly being movably secured to said second portion of said hull, said oil collection assembly operable to move in an upwards-downwards direction, said oil collection assembly further including first drum and a second drum, said first drum and said second drum being laterally adjacent to each other, said first drum and said second drum being rotatably mounted, said first drum and said second drum having five blades secured thereto, said five blades being perpendicular to the surface of said first drum and said second drum;

a first transfer assembly and a second transfer assembly, said first transfer assembly and a second transfer assembly being aft of said first drum and said second drum, said first transfer assembly configured to receive oil from said first drum, said second transfer assembly configured to receive oil from said second drum, said first transfer assembly having four walls and a bottom forming an interior volume, said second transfer assembly having four walls and a bottom forming an interior volume;

a first collection chamber and a second collection chamber, said first collection chamber being integrally formed with said first transfer assembly, said second collection chamber being integrally formed with said second transfer assembly, said first collection chamber being disposed within said first transfer assembly, said second collection chamber being disposed within said second transfer assembly, said first collection chamber configured to receive oil from said first transfer assembly, said second collection chamber configured to receive oil from said second transfer assembly;

a first separation tank and a second separation tank, said first and second separation tank operably coupled to said first and second collection chamber respectively, said first and second separation tank being aft of said oil collection assembly, said first and second separation tank being formed from a plurality of walls, a top and a bottom, said first and said second separation tank operable to store oil received from said collection chamber, said bottom of said first separation tank and said second separation tank being formed in an angular manner such that said bottom of said first separation tank and said second separation tank is angled downward from stern to bow creating a capture chamber, said capture chamber of said first separation tank and said second separation tank being coupled to said oil collection assembly, said capture chamber functioning to receive the water received into the separation tank, said first separation tank and said second separation tank being on opposing sides of the beam of the vessel; and a debris collection container, said debris collection container having four walls and a bottom formed to create an interior volume, said debris collection container superposed said deck, said debris collection container being aft of said oil collection assembly.

7. The oil recovery vessel as recited in claim 6, and further including a filter assembly, said filter assembly being adjacent to said forward edge of said floor, said filter assembly having a plurality of tines, said plurality of tines connected to a rod, said rod having a first end and a second end, said first end of said rod being secured to a first arm, said second end of said rod being secured to a second arm, said first arm being pivotally connected to said oil collection assembly, said second arm being pivotally connected to said oil collection assembly opposite said first arm, said first arm and said second arm operable to move said plurality of tine in an upwards and aft direction, said plurality of tines having a first position and a second position, said plurality of tines being proximate said forward edge of said floor in said first position, said plurality of tines being generally above said debris collection container in said second position, said plurality of tine being a modified c-shape.

8. The oil recovery vessel as recited in claim 7, and further including a first transfer blade and a second transfer blade, said first and second transfer blade disposed within the interior volume of said first and second transfer assembly respectively, said first and second transfer blade further including a shaft, said shaft being cylindrical in shape, said shaft further having secured thereto a blade, said blade being generally helical in shape, said first and second transfer blade being rotatably mounted within said first and second transfer assembly respectively, said first transfer blade having a first end and a second end, said second transfer blade having a first end and a second end, said second end of said first transfer blade being journaled into said first collection chamber and being hermetically sealed therewith, said second end of said second transfer blade being journaled into said second collection chamber and being hermetically sealed therewith, said first and second transfer blade operable to direct oil waste towards said first and second collection chamber respectively.

9. The oil recovery vessel as recited in claim 8, and further including a plurality of hydraulic cylinders, said plurality of hydraulic cylinders operably engaged with said lateral support member of said oil collection assembly, said plurality of hydraulic cylinders operable to transition said oil collection assembly between said first position and said second position, wherein in said second position said floor is beneath the waterline of the oil recovery vessel.

10. The oil recovery vessel as recited in claim 9, and further including a first ramp member and a second ramp member, said first ramp member having a lower edge and an upper edge, said second ramp member having a lower edge and an upper edge, said first and second ramp members having an arcuate portion said lower edge and said upper edge, said first ramp member being beneath said first drum, said second ramp member being underneath said second drum, said lower edge of said first and second ramp members being proximate said floor, said lower edge be at least partially beneath the water line of the oil recovery vessel in said second position of said oil collection assembly, said upper edge of said first and second ramp members being secured to said first and second transfer assembly respectively, said arcuate portion of said first ramp member and said second ramp member having arcuate angle that is equal to the circumferential angle traversed by said five blades of said first transfer blade and said second transfer blade, said first and second ramp members operable to engage said five blades of said first and second drum respectively.

11. The oil recovery vessel as recited in claim 10, and further including a plurality of storage tanks, said plurality of storage tanks being intermediate said first and second separation tanks, said plurality of storage tanks being operably coupled to said first and second separation tanks.

\* \* \* \* \*